United States Patent
Jamieson et al.

(10) Patent No.: US 7,392,536 B2
(45) Date of Patent: Jun. 24, 2008

(54) SYSTEM AND METHOD FOR UNIFIED SIGN-ON

(75) Inventors: Steve Jamieson, Bellevue, WA (US); Anil Balakrishnan, Sammamish, WA (US); Hilal Al-Hilali, Seattle, WA (US); Christopher Robert Houser, Woodinville, WA (US); Rex George Torres, Snohomish, WA (US); Joseph W. Sharp, Sammamish, WA (US); Jean-Emile Elien, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 10/464,648

(22) Filed: Jun. 18, 2003

(65) Prior Publication Data

US 2005/0005094 A1   Jan. 6, 2005

(51) Int. Cl.
G06F 15/16 (2006.01)
G06F 17/30 (2006.01)
G06F 7/04 (2006.01)
G06F 7/58 (2006.01)
G06K 19/00 (2006.01)
G06K 9/00 (2006.01)
H04L 9/32 (2006.01)

(52) U.S. Cl. .............................. 726/8; 726/10; 713/156; 713/168

(58) Field of Classification Search ................. 713/155, 713/156; 726/8, 5, 10
See application file for complete search history.

(56) References Cited

U.S. PATENT DOCUMENTS

| 5,604,490 A | 2/1997 | Blakley, III et al. | .... 340/825.31 |
|---|---|---|---|
| 5,611,048 A | 3/1997 | Jacobs et al. | ........... 395/200.09 |
| 5,655,077 A | 8/1997 | Jones et al. | ............ 395/187.01 |
| 5,684,950 A * | 11/1997 | Dare et al. | ..................... 726/10 |
| 5,689,638 A | 11/1997 | Sadovsky | .............. 395/188.01 |
| 5,719,941 A | 2/1998 | Swift et al. | .................... 380/25 |
| 5,764,890 A | 6/1998 | Glasser et al. | ......... 395/188.01 |
| 5,768,504 A | 6/1998 | Kells et al. | ............. 395/187.01 |
| 5,797,030 A | 8/1998 | Hoaby | ........................ 395/827 |
| 5,908,469 A | 6/1999 | Botz et al. | ................... 713/201 |
| 6,006,334 A | 12/1999 | Nguyen et al. | .............. 713/202 |
| 6,154,843 A | 11/2000 | Hart, Jr. et al. | .............. 713/201 |

(Continued)

OTHER PUBLICATIONS

William Stallings (Book, title, "Cryptography and Network Security", principles and practices, Second Edition) (Year of Publication, 1999 (p. 323-330).*

(Continued)

*Primary Examiner*—Gilberto Barron, Jr.
*Assistant Examiner*—Samson Lemma
(74) *Attorney, Agent, or Firm*—Woodcock Washburn LLP

(57) ABSTRACT

A mechanism is provided for signing on a user of a first domain into an affiliate application in a second domain. When the user needs access to the affiliate application, the request for access causes a ticket to be generated. The ticket identifies the user and is passed to an adapter. The adapter, which ultimately will perform the sign on in the affiliate application, redeems the ticket for the user's credentials (e.g., a valid userID/password combination for the affiliate application), and then presents the credentials to the affiliate application. A service is provided that issues tickets, redeems tickets, manages the registration and de-registration of affiliate applications, manages the correlation between a user and the user's credentials with an affiliate application, and manages encryption of stored records.

24 Claims, 8 Drawing Sheets

U.S. PATENT DOCUMENTS

| | | | |
|---|---|---|---|
| 6,178,511 B1 | 1/2001 | Cohen et al. | 713/201 |
| 6,223,292 B1 | 4/2001 | Dean et al. | 713/202 |
| 6,243,816 B1 | 6/2001 | Fang et al. | 713/202 |
| 6,256,676 B1* | 7/2001 | Taylor et al. | 709/246 |
| 6,275,944 B1 | 8/2001 | Kao et al. | 713/202 |
| 6,308,273 B1 | 10/2001 | Goertzel et al. | 713/201 |
| 6,377,994 B1 | 4/2002 | Ault et al. | 709/229 |
| 6,389,543 B1 | 5/2002 | Dawson et al. | 713/202 |
| 6,442,695 B1 | 8/2002 | Dutcher et al. | 713/201 |
| 2003/0149781 A1* | 8/2003 | Yared et al. | 709/229 |
| 2004/0003287 A1* | 1/2004 | Zissimopoulos et al. | 713/201 |
| 2004/0103323 A1* | 5/2004 | Dominic | 713/202 |
| 2006/0179003 A1* | 8/2006 | Steele et al. | 705/59 |

OTHER PUBLICATIONS

Asaravala, A., "A Question of Identity, Passport, Liberty, and the Single Sign-On Race", *New Architect*, 2003, 8(1), 4 pages.

Chinitz, J., "Single Sign-On: Is It Really Possible?", *Information Systems Security*, 2000, 9(3), 32-45.

Kilgallen, L.J., "The Hazards of Single Sign-On", *Computer Security Journal*, 1994, 10(1), 1-9.

Kornievskaia, O., et al. "Kerberized Credential Translation: A Solution to Web Access Control", *Proceedings of the 10th USENIX Security Symposium*, 2001, 235-249.

Mouly, D., "Single Sign-On: Disspelling the Myths", *Network Computing*, 2001, 11(1), 28-29.

Volchkov, A., "Revisiting Single Sign-On, A Pragmatic Approach in an New Context", *IT Professional*, 2001, 3(1), 39-45.

* cited by examiner

| NTD | NTU | XA | XU |
|---|---|---|---|
| Redmond | henry | UNIX1 | HSMITH |
| Redmond | james | UNIX1 | JJONES |
| Redmond | james | IBM | JJ |
| . | . | . | . |
| . | . | . | . |
| . | . | . | . |

801

| XA | XU | XP |
|---|---|---|
| UNIX1 | HSMITH | 'fish' |
| UNIX1 | JJONES | 'bird' |
| IBM | JJ | 'elephant' |
| . | . | . |
| . | . | . |
| . | . | . |

802

SYSTEM AND METHOD FOR UNIFIED SIGN-ON

FIELD OF THE INVENTION

The present invention relates generally to the field of distributed computing. More particularly, the invention provides a mechanism whereby a user who has signed on in a first domain may sign on to a second domain without having to manually enter the sign-on credentials in the second domain.

BACKGROUND OF THE INVENTION

In a distributed computing environment, resources or services that a user needs to access may be spread out across different computers. As one example, each employee in an enterprise may have a desktop or laptop computer, which accesses files stored in a central cluster of file servers. Each of these various computers may be controlled by a sign on procedure that requires presentation of credentials. For example, the user may have to enter a valid userID/password combination in order to gain access to the computer. Typically, once a user is signed onto his or her desktop or laptop, he or she does not have to enter a userID/password combination again in order to access the file server, because the file server and the user's computer are part of the same domain.

However, in some cases a user may be working in a first domain (e.g., an environment based on the MICROSOFT WINDOWS operating systems), and may need to access information in a second domain of a different type (e.g., a cluster of computers based on the UNIX operating system). The second domain may maintain its own userIDs and passwords, and may require that the user sign-on to the second domain separately. Conventionally, when the user attempts to access the second domain, the second domain will present the user with a prompt to enter a userID and password for the second domain, which is clearly an inconvenience to the user. It is desirable to allow the user to access the second domain seamlessly—i.e., given that the user has signed onto the first domain, it is desirable to allow the user to access resources and services under his corresponding userID in the second domain, without having to manually enter the userID/password combination for the second domain.

In view of the foregoing, there is a need for a system and method that overcome the drawbacks of the prior art.

SUMMARY OF THE INVENTION

The present invention provides a mechanism whereby a user who has signed onto a first domain can sign onto a second domain without having to explicitly tender his credentials. For example, the first domain may be an environment based on the MICROSOFT WINDOWS operating systems, and the second domain may be an environment based on the UNIX operating system. In order to use the second environment, the user will have to be signed onto the second environment, and generally must tender a user identifier ("userID") and password for that environment. In accordance with the invention, the user may use a service in the first domain to register a mapping between his persona in the first domain, and his corresponding userID/password combination in the second domain. When the user attempts to access the second domain, an adapter in the first domain tenders the registered userID/password combination on the user's behalf, without requiring the user's direct involvement. Thus, it may appear to the user as if he can seamlessly access the second domain merely by virtue of having signed on to the first domain. A mechanism that permits such access to the second domain is referred to herein as a single sign-on ("SSO") system.

An SSO system in accordance with the invention operates in the first domain, and manages access to "affiliate applications." An affiliate application is an environment to which access is controlled by credentials, and which the user may access from the first domain. Thus, a UNIX environment, access to which requires that the user login with a userID and password, is an example of an affiliate application. Similarly, an SAP application running in the UNIX environment is also an example of an affiliate application, since the SAP application may require that the user sign onto the SAP application, in addition to logging into the surrounding UNIX environment. Each affiliate application is associated with an "adapter." An adapter presents the user's credentials to a particular application. For example, the adapter for a UNIX system may be configured to enter the user's userID and password in response to the prompts "login:" and "password:". Similarly, the adapter for an SAP application running in a UNIX environment may be configured to first log the user into a UNIX system (using a first userID/password combination), and then sign the user onto the SAP system (using a second userID/password combination). Preferably, each affiliate application has its own adapter that is configured to negotiate the presentation of the user's credentials with that particular affiliate application.

The adapters are used in the following manner. When a user requests to access an affiliate application, the request is sent to a middleware software object that handles certain types of requests (e.g., outbound HTTP requests, etc.) from the user. (Alternatively, the application that the user is using may function as the middleware object, in which case the request need not be sent to such object.) The middleware object determines that the user is requesting access to an affiliate application, and then contacts an SSO service to obtain a ticket for the user. The SSO service maintains a database, which contains tables that map each user to his corresponding credentials in affiliate applications, and also contains information relating to the management of affiliate applications. When the SSO service receives a ticket request, it issues a ticket for the user, which preferably contains the user's current domain, the user's userID in the current domain, and an expiration time. In a preferred embodiment, the ticket does not need to identify the external application that the user seeks to access, or the adapter that will be used to perform the access. Once the ticket is issued, the ticket is returned to the middleware object.

The middleware object then sends the ticket to the adapter that will negotiate the presentation of credentials to the affiliate application. The adapter then sends the ticket to the SSO service, with a request to redeem the ticket. The SSO service receives the ticket and redemption request, and then looks up the user's credentials for the affiliate application in the SSO service's database. Before looking up the credentials, the SSO service preferably determines that the userID under which the adapter is running is authorized to redeem tickets. Additionally, inasmuch as a user may have a different set of registered credentials for each of the different affiliate applications, the SSO service identifies a particular set of credentials based on which adapter is making the redemption request. Since each affiliate application preferably has its own adapter, the identity of the adapter making the request, combined with the identity of the user specified in the ticket, is sufficient to identify the particular set of credentials that are needed to access the affiliate application on the user's behalf. Preferably, the SSO service encrypts the ticket upon issuance, and decrypts the ticket when the SSO service receives the redemption request. In a preferred embodiment, an instance of the SSO does not persistently store the encryption/decryption secret, but rather copies the secret from a server that maintains a master encryption secret to perform the encryption and decryption.

In a preferred embodiment, the privilege to control the SSO service, and the privilege to affect the contents of the database in which credentials are stored, is governed by a set of groups whose members have various different sets of privileges. Preferably, these groups include: (1) an admin group, whose members can perform any action within the SSO system; (2) an affiliate admin group, whose members can add and delete affiliate applications, and can define membership in lower-level groups; (3) for each affiliate application, an application admin group, whose members can affect the credential mappings relating to that particular affiliate application, and who can define membership in the user groups for that affiliate application; and (4) for each affiliate application, an application user group, whose members are registered to use that affiliate application.

Preferably, credential mappings are stored in the SSO service's database in a form encrypted by a secret. In some cases, it is desirable periodically to change the secret. In this case, a rolling re-encryptor runs through the credential mappings, decrypts the mappings with the old secret, and re-encrypts the mappings with the new secret. During the re-encryption process, credentials may be encrypted with either one of the two secrets. Thus, each secret has an identifier associated therewith, and each encrypted datum specifies the identifier of the secret with which it is encrypted. Thus, all of the encrypted data in the database can be decrypted, even while the process of re-encrypting the data with a new secret is underway.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

When a user accesses various different computers in a single domain, the user signs on to a computer once and will then be recognized by other computers in the domain without having to sign on again. However, in many cases, a user may be working in one domain and need to access another domain, thereby requiring that the user enter a userId and password in the other domain. The present invention provides a mechanism whereby a user in one domain may have his credentials (e.g., userID and password) tendered in the other domain on his behalf, thereby making it appear to the user as if he is seamlessly signed onto both domains.

Exemplary Computing Environment

Figure 1:
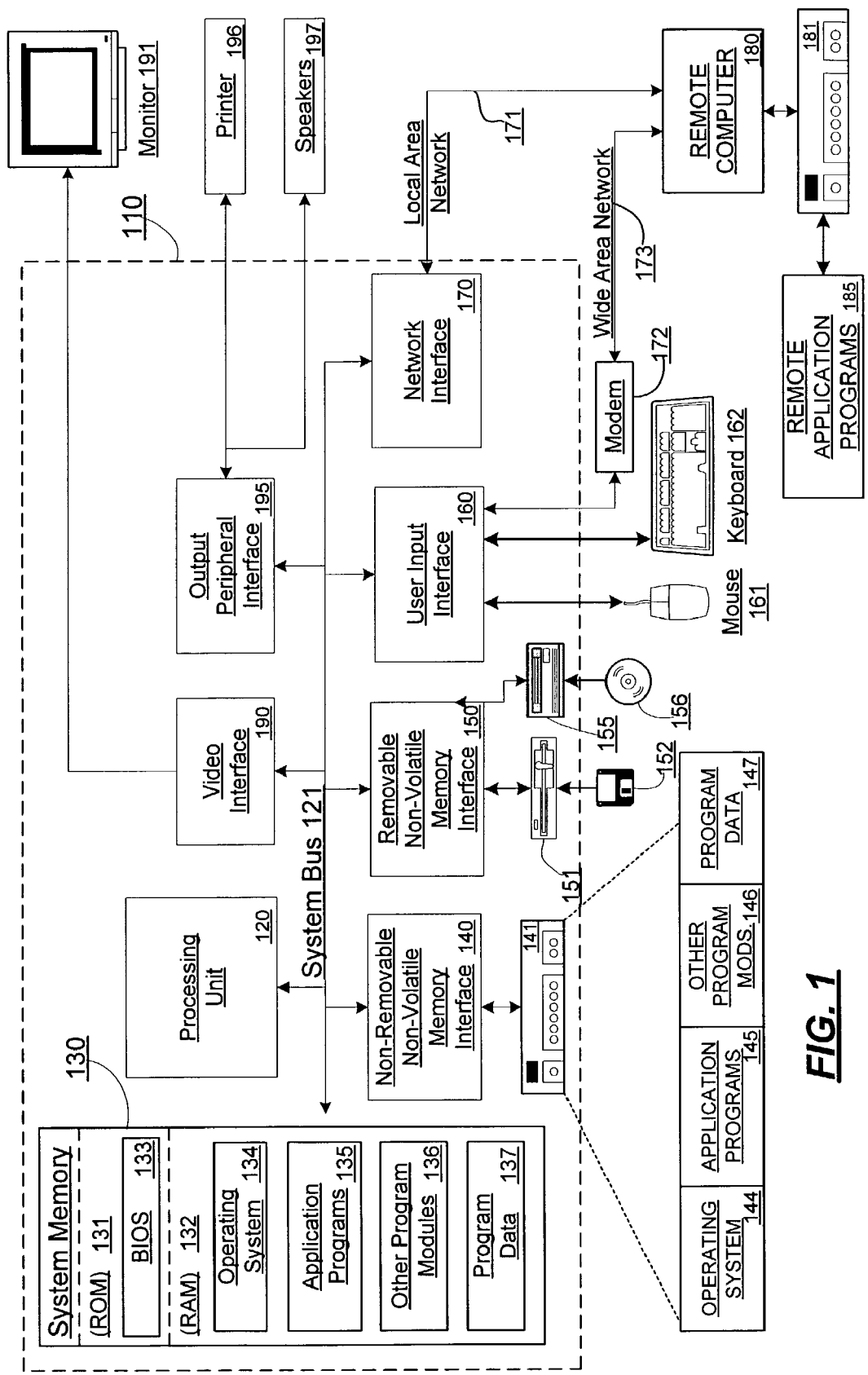
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Sign-on Across Domains in a Multi-Domain Environment

Figure 2:
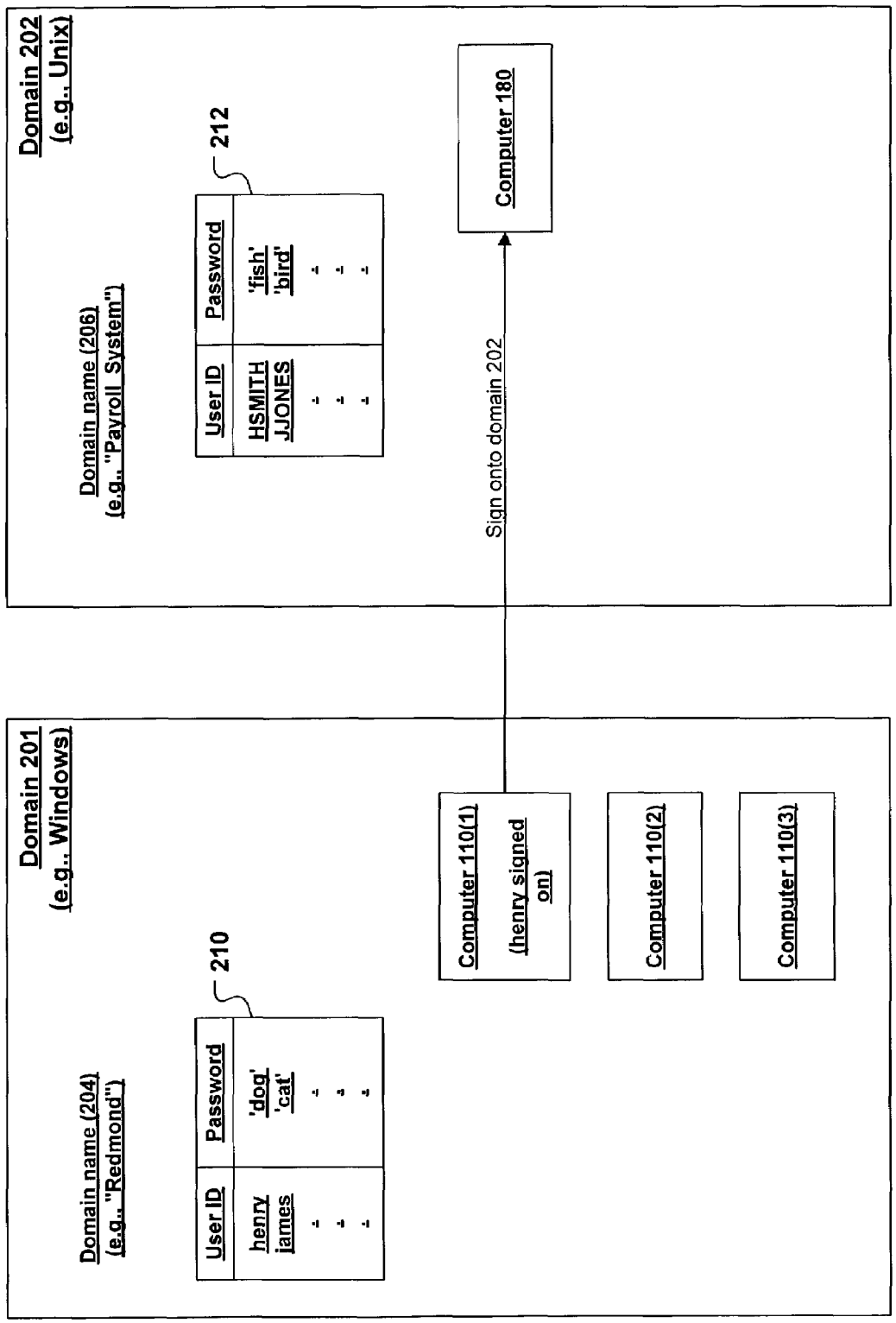
FIG. 2 is a block diagram of an environment in which a user signed on in a first domain may sign on to use an application in a second domain.

The invention addresses the situation in which a user, who is signed on in one domain, may need to access an application that exists outside of the domain (an "affiliate application"), access to which is conditioned upon a set of sign-on credential. FIG. 2 shows an exemplary environment in which this situation may occur.

FIG. 2 shows domains 201 and 202. Each of the domains typically has a name 204 and 206 associated therewith. Thus, in this example, domain 201 has the name "Redmond," and domain 202 has the name "payroll system." (It will be noted that domain names can be assigned in any manner—e.g., by geography, by function, by department within an organization, etc. The domain name is merely for identification.) Each of the domains is a computing environment in which some set of resources (e.g., files, applications, services, etc.) may be available to users who have valid credentials for the domain. In this example, computers 110(1), 110(2), and 110(3) participate in domain 201. A user may login (or "sign on") to a computer as a particular user, thereby gaining access to all of the resources in domain 201 to which that particular user is entitled. In the example of FIG. 2, a user named "henry" is signed onto computer 110(1). There may be certain resources to which access is granted or denied based on which user is requesting access. By signing in as "henry," the user of computer 110(1) gains access to all resources in domain 201 that "henry" is permitted to access.

Access to domain 201 (and to the resources that a particular user is permitted to access within that domain) is controlled by "credentials." In the example of FIG. 2, the credentials are a user identifier ("userID") and password combination. At the initiation of a session in domain 201, the user is asked to present a valid userId and password combination. If a valid combination is presented, then the user gains access; if a valid combination is not presented, then the user does not gain access. Even if the user presents a valid combination, the particular resources to which the user has access is typically based on which userId the user has presented to sign on. Thus, signing on as "henry" may give the user access to different resources (e.g., different files, different devices, etc.) than would be available if the user had signed on under another userId (e.g., "james").

The set of valid credentials is maintained in a credential record 210. In the example of FIG. 2, credential record 210 is a table that correlates each known userId with it's correct password. Credential record 210 shows that "henry" and "james" are valid userIDs for domain 201, with passwords "dog" and "cat," respectively. It should be understood that credential record 210 is merely exemplary, and a variety of other types of credential records are possible. For example, as an alternative to storing the actual password for a given userID, credential record 210 could store a hash of the password, a reference to a password stored elsewhere, or any other type of information that can be used to determine whether a userID/passwords combination is valid. Additionally, credentials are not limited to userID/password combinations, but may be based on any other type of authenticating information, such as a digital certificate stored on a smart card, biometric information such as fingerprints or retinal features, etc.

A user within domain 201 may need to access an affiliate application, such as a computer in a separate domain 202, or a specific application running on such a computer. For example, computer 180 may participate in domain 202, and a user who is signed onto domain 201 may need to access a service provided by computer 180. Domain 202 maintains its own credential record 212, which is different from credential record 210. Thus, a userID/password combination that is valid in domain 201 may not be valid in domain 202. In this example, credential record 212 does not list "henry" and "james" as valid users, but does list "HSMITH" and "JJONES" as valid users. In the example of FIG. 2, both domains 201 and 202 use userID/password combinations as credentials, although it should be understood that two domains need not use the same type of credentials—e.g., domain 201 might accept userID/password combinations, and domain 202 might use digital cryptographic certificates.

It may be the case that a given person has a set of valid credentials in both domains 201 and 202. For example, a person named "Henry Smith" may have the userID "henry" in domain 201, and "HSMITH" in domain 202. Moreover, there may be some services that Henry Smith needs to access in domain 202 while working in domain 201. Thus, Henry Smith, while signed on as "henry" in domain 201 may use remote communications software to access domain 202 (e.g., by connecting to computer 180), and may then use his valid credentials in domain 202 to gain access to those services. Conventionally, when Henry Smith contacts a computer in domain 202, he will be prompted to enter his userID/password combination, at which time Henry Smith would enter "HSMITH" as the userID and "fish" as the password. The invention, however, provides a mechanism through which Henry Smith's persona in domain 201 (i.e., userID="henry") can be correlated with Henry Smith's persona in domain 202 (i.e., userID="HSMITH"), so that software running in domain 201 can lookup Henry Smith's credentials for domain 202 and tender those credentials to the authentication process in domain 202.

Figure 3:
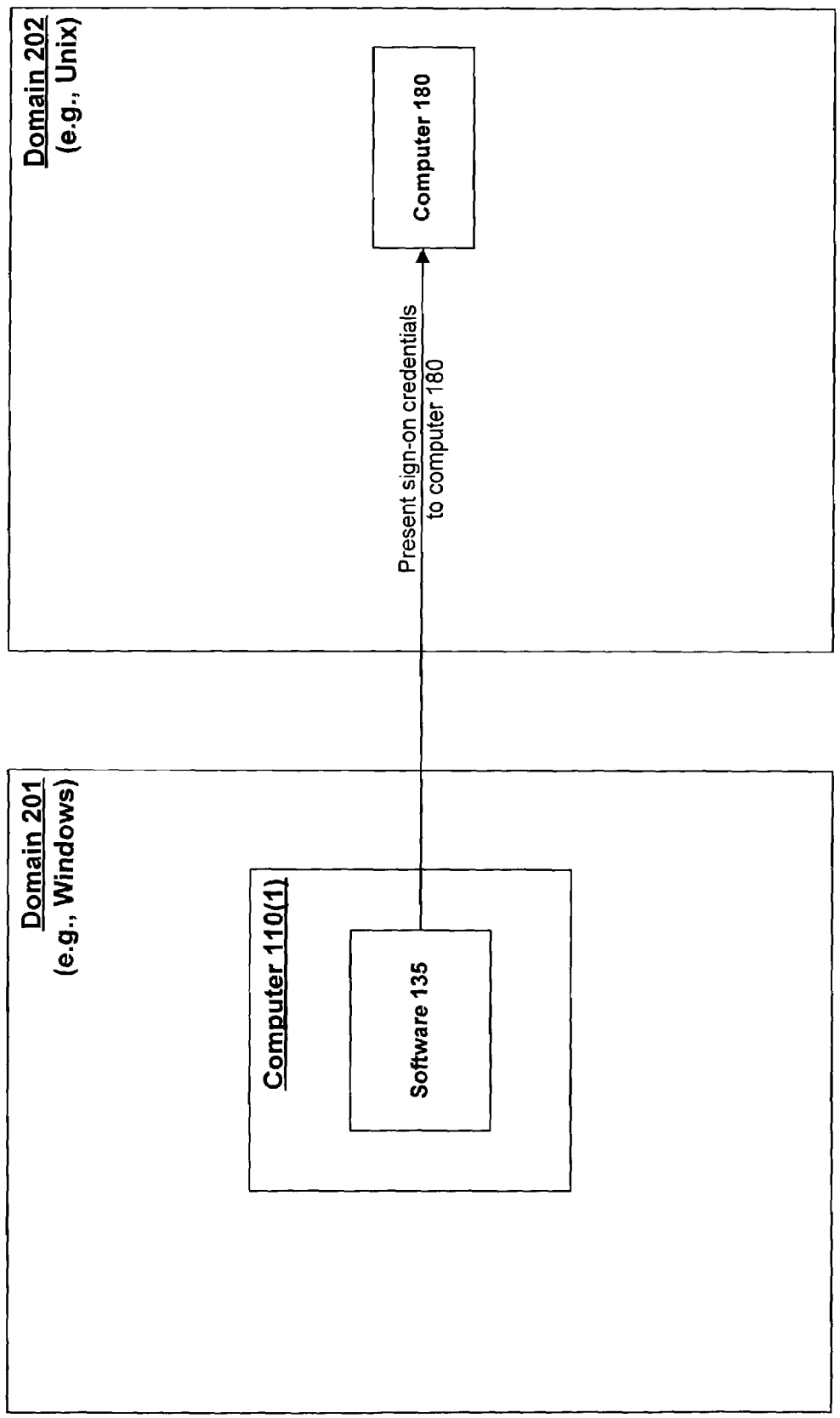
FIG. 3 is a block diagram of an environment having first and second domains, in which a component performs a sign on in a second domain on behalf of a user in a first domain.

FIG. 3 shows an example in which a component of domain 201 (e.g., software 135 running on computer 110(1)) tenders a user's credentials to an authentication process in domain 202, instead of the user having to manually tender those credentials. In the example of FIG. 3, software 135 is running under the userID "henry" in domain 201. Software component 135 has access to "henry's" corresponding credentials in domain 202. As in the example of FIG. 2, "HSMITH" is the userID in domain 202 for the same person who is signed in as "henry" in domain 201. Software 135 determines who the current user in domain 201 is (i.e., "henry," in this example), determines what that user's credentials are in domain 202 (i.e., userID="HSMITH", and password="fish"), and presents those credentials to the authentication process running on computer 180 in domain 202. In effect, once "henry" signs onto domain 201, he is seamlessly able to access resources in domain 202; since "henry" has once authenticated himself in domain 201, software 135 will present, on "henry's" behalf, any credentials necessary for "henry" to gain access to domain 202.

In the example of FIG. 3, it is presumed that software 135 can: (1) determine which credentials in domain 202 correspond to the currently-signed-on user "henry," (2) access "henry's" corresponding userID/password combination for domain 202, and (3) negotiate the presentation of those credentials to the authentication process running in domain 202. Creating software that provides this functionality presents certain challenges, however. As described below, the invention provides various mechanisms that allow these functions to be achieved.

Architecture to Support Sign-On Across Domains

Figure 4:
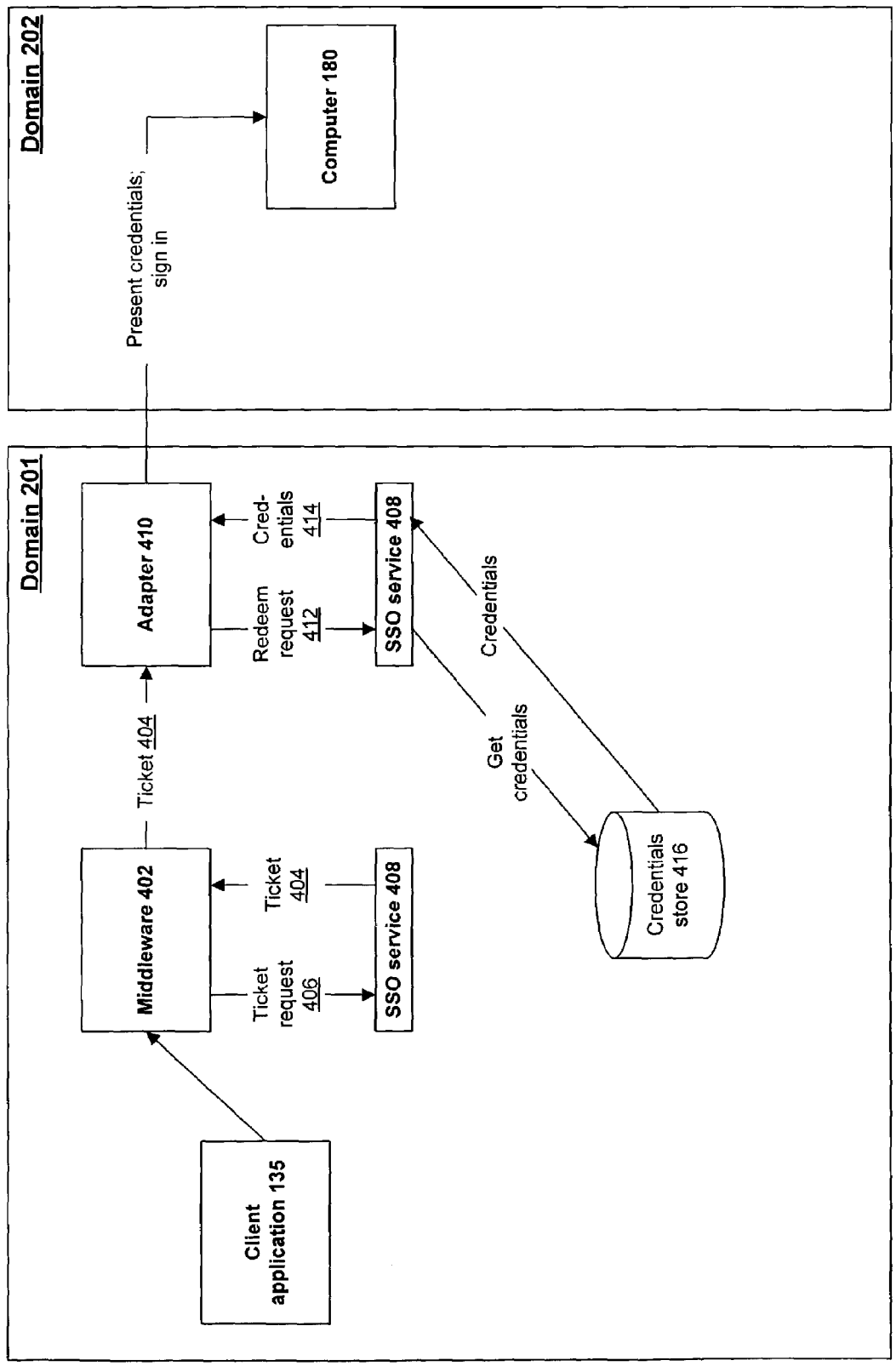
FIG. 4 is a block diagram of an architecture that supports the use of an adapter to sign into a second domain on behalf of a user signed onto a first domain.

FIG. 4 shows an exemplary architecture wherein a user may be signed into a first domain, and have his corresponding credentials in a second domain presented to the second domain on his behalf. In the example of FIG. 4, a user (e.g., "henry") is signed onto domain 201. At some point while "henry" is using domain 201, he requires a resource that is available in domain 202. For example, "henry" may be using some software (e.g., client application 135) to perform an accounting function in the "Redmond" domain 201, and may require access to payroll records that are stored in the "Payroll_System" domain 202, and that can only be accessed by a different application in domain 202. In effect, access to the payroll records is a resource that requires a legitimate user to sign onto domain 202.

In order to permit client application 135 to access the payroll records in domain 202, client application 135 communicates to middleware 402 a request to access domain 202. (Client application 135 may contain the functionality of middleware object 402, in which case the request need not be communicated to a separate object.) Middleware 402 may, for example, be the engine for a transport protocol, such as Hypertext Transfer Protocol (HTTP) or Secure Hypertext Transfer Protocol (HTTPS). Middleware 402 then issues a request 406 for a "ticket." The ticket, if ultimately issued, will be redeemable by adapter 410 for the credentials that will be needed to access domain 202 on "henry's" behalf; the manner in which the ticket can be redeemed is described in greater detail below. The ticket request 406 is issued to an SSO service 408, running on the computer on which middleware 402 operates. As one example, SSO service 408 may be implemented as a service of an operating system, although SSO service 408 may be implemented as any other type of software object with which middleware 402 can communicate. (As noted above, the functionality of middleware 402 may be contained within client application 135, in which case client application 135 communicates with SSO service 408 directly.) An exemplary structure of SSO service 408 is described in greater detail below in connection with FIG. 6.

When middleware 402 issues request 406, middleware 402 preferably "impersonates" the user "henry." Thus, middleware 402 is preferably not running as "henry," but the underlying system in which the request is issued may have the capability to allow a process running under one userID to issue a request to a service as if the request came from a different userId. For example, in the WINDOWS operating systems, a service can impersonate a currently-logged-in user.

SSO service 408 receives ticket request 406, and issues a ticket for the user who has made the request. As noted above, middleware 402 impersonates the underlying user ("henry," in this example), so SSO service 408 concludes that the request has come from "henry," and issues a ticket 404 that will entitle adapter 410 to redeem ticket 404 for "henry's" credentials. (It should be noted that SSO service 408 only issues a ticket for the user making the request (or the user has been impersonated); since only valid, logged-in users can be impersonated, this scheme ensures that a ticket can only be issued for a user who has been authenticated and is logged in.) Preferably, ticket 406 includes an expiration time (e.g., two minutes into the future), so that it cannot be redeemed beyond its expiration time. In a typical scenario, it is expected that adapter 410 will perform the sign-on procedure with domain 202 in the very near future (e.g., within the next few seconds), so an attempt to redeem ticket 404 long after it was issued may be symptomatic of an attempt by a rogue party to learn a user's credentials. Imposing a relatively short expiration time on ticket 404 guards against this type of attempt to compromise the secrecy of user credentials. Additionally, the ticket is preferably encrypted with a key that is only known to a component accessible by an SSO service; this encryption of the ticket guards against the creation of counterfeit tickets.

Once middleware 402 has received ticket 404, middleware 402 sends ticket 404 to adapter 410. Adapter 410 issue a redemption request 412 to SSO service 408 in order to redeem ticket 404. Adapter 410 is a software component that runs on a computer in domain 201. One of the functions performed by adapter 410 is to negotiate the presentation of a user's credentials to an application in domain 202. Adapter 410 is running under a particular userId within domain 201. Typically, adapter 410 runs under the userID of a privileged user, who is known to SSO service 408 as someone who is entitled to redeem tickets. When SSO service 408 receives ticket 404 with redemption request 412, SSO service 408 determines whether the userId under which adapter 410 is running is entitled to redeem tickets. The manner in which SSO service 408 makes this determination is discussed in greater detail below in connection with FIG. 7. Assuming that the userID under which adapter 410 is running is entitled to redeem tickets, SSO service 408 retrieves, from credential store 416, the credentials 414 for the user identified in -ticket 404 (e.g., the credentials that user "henry" will need to gain access to his corresponding "HSMITH" account in domain 202). Since ticket 404 is preferably encrypted, SSO service 408 decrypts ticket 404 in order to determine which user is identified in ticket 404. Before retrieving credentials 414, SSO service 408 preferably ensures that the expiration time specified in ticket 404 has not elapsed; if ticket 404 has expired, then SSO service 408 does not retrieve credentials 414. If redemption of a ticket fails (e.g., because of expiration date, or because the redemption request has come from a non-authorized entity), then in a preferred embodiment an appropriate error code is returned to the adapter, and an error log message is generated.

As discussed in greater detail below in connection with FIG. 8, a user in domain 201 may have several different sets of corresponding credential stored in credential store 416. These different sets of credentials may correspond to the various different affiliate applications (e.g., different domains, or different credential-controlled applications within a given domain) that a given user may need to access. In a preferred embodiment, a user (in domain 201) may have a different set of credentials for each affiliate application. Additionally, each affiliate application has its own adapter—i.e., one adapter may negotiate a user's access to affiliate application A (requiring one set of credentials), and another adapter may negotiate a user's access to affiliate application B (requiring a different set of credentials). Preferably, SSO service 408 determines which set of credentials to retrieve based on which adapter is making the request. Thus, SSO service 408 retrieves, from credential store 416, the particular set of "henry's" credentials that are associated with adapter 410. In an alternative embodiment, a single adapter may be designed to sign onto plural affiliate applications, in which case the adapter either requests the credentials for all affiliate applications that the adapter is designed to work with, or else requests the credentials for the particular affiliate application that the adapter needs to sign the user onto.

After credentials 414 have been retrieved from credential store 416, SSO service 408 provides credentials 414 to adapter 410. In a preferred embodiment, SSO service 408 caches the credentials, which facilitates efficient retrieval of those credentials if they are requested again in the near future. When credentials are cached, SSO service frequently (e.g., every 30 seconds) checks the cached credentials against a log of changes to credential store 416, in order to ensure that the credentials have not been changed since they were cached. (Preferably, changes to credential store 416 are stored in a log as they are made. This logging of changes not only facilitates cache validation, but also facilitates auditing of credentials store 416.)

After adapter 410 has received credentials 414, adapter 410 then uses credentials 414 to gain access to domain 202. For example, adapter 410 may contact a computer (e.g., computer 180) in domain 202, and request to sign-on. Computer 180 then invokes its authentication process (i.e., the process by which it allows a user seeking access to tender credentials), and allows adapter 410 to use credentials 414 to sign on as the user identified in the credentials. In the case where credentials 414 comprise a userID/password combination, computer 180 may present adapter 410 with prompts (e.g., the prompt strings "login:" and "password:"), and adapter 410 will respond by presenting the userID and password specified in credentials 414. It should be noted that an adapter can be created to handle any type of authentication process that computer 180 may require, and thus the architecture of FIG. 4 can be used regardless of what type of system domain 202 might be (e.g., UNIX system, IBM Mainframe, Oracle database, etc.). In particular, it should be noted that in some cases the affiliate application to which the user is attempting to gain access is not merely a domain itself, but rather a particular application running in that domain—e.g., an SAP application running in a UNIX environment. Thus, an adapter for the SAP application may: (1) sign the user onto the UNIX system, and (2) after gaining general access to the UNIX system itself, sign the user onto the SAP application. An adapter can be created to negotiate any type of credential-presentation, as required by the particular type of affiliate application to which access is sought.

It should be noted that FIG. 4 shows two separate instances of SSO service 408. An instance of SSO service 408 is typically provided on each computer at which SSO service 408's functions may be required. In the architecture of FIG. 4, different software components that use SSO service 408 may be running on the same computer, or may be running on different computers. In the example of FIG. 4, middleware 402 and adapter 410 are each running on different computers, and thus each of these components communicates with its own instance of SSO service 408. However, if middleware 402 and adapter 410 are running on the same computer, they may each communicate with the same instance of SSO service 408.

Tickets

Figure 5:
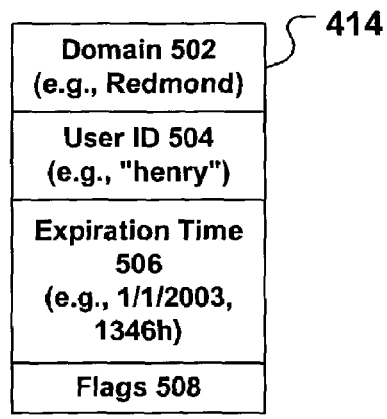
FIG. 5 is a block diagram of a ticket that may be used in the architecture of FIG. 4.

As described above, the architecture of FIG. 4 uses a ticket 404, which is a data item whose function is to be redeemable for a user's credentials. An exemplary structure for ticket 404 is shown in FIG. 5.

Ticket 404 preferably comprises fields for: a domain 502, a userID 504, and an expiration time 506. Ticket 404 may, optionally, comprise flags 508, which can be used to specify certain behaviors of SSO service 408 in the ticket redemption process.

Domain field 502 specifies the domain of the user account for which ticket 404 is requested. In the example of FIG. 4, the request for ticket 404 request is for the user named "henry" in the Redmond domain, so domain field 502 contains "Redmond" (or some other datum that identifies the "Redmond" domain).

UserID field 504 specifies the identity of the user on whose behalf ticket 404 was requested. In the example of FIG. 4, ticket 404 was requested on behalf of the user "henry," so userID field 504 contains the string "henry."

Expiration time field 506 specifies the time at which ticket 404 expires. For example, if ticket 404 was requested on Jan. 1, 2003 at 1344 h, then expiration time field 506 may contain Jan. 1, 2003 at 1346 h (two minutes after the ticket was requested).

It should be noted that the ticket need not contain the identity of the adapter that will ultimately retrieve the credentials. As noted above, each set of credentials is associated with a particular user and a particular adapter. Thus, when ticket 404 is redeemed, SSO service 408 will identify which credentials to provide based on: (1) the user identified in ticket 404, and (2) the adapter making the request. Thus, even though ticket 404 does not specify which adapter is expected to redeem the ticket, the adapter that redeems the ticket will receive only the credentials that relate to the affiliate application managed by that adapter, and not some other set of credentials for the user named in the ticket. In fact, when the exemplary structure of FIG. 5 is used for a ticket, the same ticket may be redeemed by different adapters for different sets of credentials.

In a preferred embodiment, tickets may be redeemed through a call to SSO service 408. In one example, SSO service 408 exposes a "validate_and_redeem_ticket" API (Application Programming Interface), which works as follows:

The ticket preferably contains the user for whom the host credential lookup needs to be done. The sender of the message to the adapter itself could be different. The sender of the message could send multiple copies of the same ticket. If the sender of the message is not the same as the user in the ticket, then host credentials cannot be looked up.

In the BizTalk system, a trusted BizTalk application can send a message to the adapter and "act" as if the sender is really the user.

Untrusted applications can also send a message to the adapter to do the host credential lookup and if the user in the ticket is same as the sender of the message, host credential lookup can be done. If not, access is denied.

The adapter will call SSO such that it passes the context of the message and the affiliate application name for which the host credentials need to be looked up. SSO exposes the API ("validate_and_redeem_ticket") to the adapter writers. This API compares the sender of the message and the user in the ticket. If they are the same, the ticket is redeemed and the host credentials are returned to the user. If they are different, access is denied. This error is returned to the adapter and an event is logged.

Exemplary Structure for an SSO Service

SSO service 408 manages the information used by the single sign on process of the present invention, and exposes various functions that can be used by participants in the process. As described above in connection with FIG. 4 SSO service 408 exposes functionality that is used to issue and redeem tickets. In addition, SSO service 408 preferably exposes functionality that enables: the registration and deletion of affiliate applications; the mapping of user IDs in domain 201 into user IDs in domain 202; and the definition of which users have various levels of privilege within the SSO system.

Figure 6:
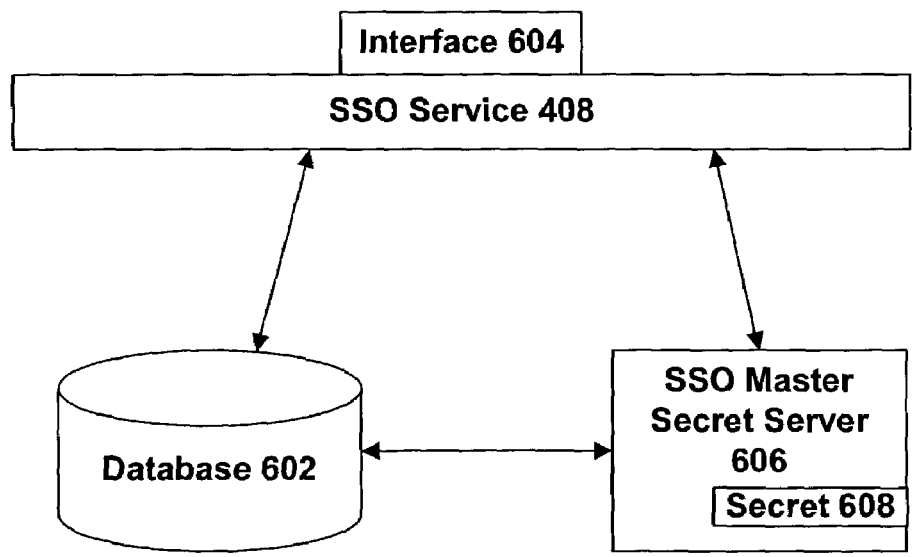
FIG. 6 is a block diagram of a service that may be used in the architecture of FIG. 4.

FIG. 6 shows an exemplary structure for SSO service 408. SSO service 408 exposes an interface 604, whereby a software object (e.g., middleware 402, adapter 410, etc.) may access the functionality of SSO service 408. For example, SSO service 408 may expose an "issue_ticket" method and a "redeem_ticket" method that allow the caller to request or redeem a ticket. Additionally, SSO service 408 may expose functions such as "add_affiliate_application," "delete_affiliate_application," "add_mapping," or "delete_mapping," in order to add/delete add/delete affiliate applications, or add/delete mappings. Moreover, SSO service 408 may permit different users to perform different functions within the system (e.g., only a user who is authorized to do so can redeem a ticket, etc.), and SSO service 408 may expose functions that allow an administrator to specify which users are permitted to do what. An exemplary hierarchy of permissions that different users may be granted is discussed in greater detail below in connection with FIG. 7.

Information used by SSO service 408 is stored in database 602. For example, credential store 416 (shown in FIG. 4), which correlates users in domain 201 with their corresponding credentials in other domains 202, is stored within database 602. Additionally, database 602 may store a table of registered affiliate applications, and tables of which users have various different levels of privilege with respect to the SSO system. Typically, each domain has one database 602. If SSO service 408 is running on a computer other than the one on which database 602 resides, then that instance of SSO service 408 accesses database 602 remotely. Alternatively, copies of the contents of database 602 may be stored on each machine that provides SSO service 408, and the various copies of database 602 may by synchronized frequently.

SSO service 408 may handle certain data in an encrypted form. For example, as noted above, tickets 404 are preferably encrypted. Additionally, the credentials stored in database 602 are preferably encrypted. The security of the information protected by encryption depends on the secret (e.g., the decryption key) that is used to decrypt the information not being divulged. To support this level of security, the secret preferably is not persistently stored on every instance of SSO service 408, but rather is kept by master secret server 606. Master secret server may be a special instance of an SSO service 408, which is adapted to provide the master secret to other instances of SSO service 408. In general, instances of SSO service 408 (other than the master secret server 606) copy the master secret to themselves, and store the secret locally (but not persistently) to be used as necessary. The master secret server 606 may also perform various other functions relating to encryption or decryption. (One such "other" function—rolling re-encryption—is described below in connection with FIG. 10.)

One example use of master secret server 606 is in the ticketing/redemption process. When a ticket request is issued to an instance of SSO service 408, SSO service 408 may generate the ticket and then copy secret 606 from master secret server 606 so that SSO service 408 can encrypt the ticket with secret 608. When the ticket is redeemed, the instance of SSO service 408 that receives the ticket copies secret 606 from master secret server 606, and then uses secret 608 to decrypt the ticket. Additionally, instances of SSO service 408 copy secret 608 from master secret server 608 when the secret is needed to encrypt the credentials that are stored in database 602, and to decrypt those credentials when necessary to redeem a ticket.

SSO service 408 may, for example, be embodied as a collection of one or more executable files. As noted above, SSO service 408 may be a service provided by an operating system, in which case these executables may be invoked when the operating system is started. In one embodiment, SSO service 408 comprises different executable files for the various functions that SSO service 408 provides—e.g., one executable for ticketing functions, another to create and delete mappings, another for maintaining the master secret, and so on. (When a separate executable exists for maintaining the master secret, this executable is preferably run only in the instance of SSO service 408 that functions as the master secret server.)

Exemplary Privileges Hierarchy

As described above, an SSO system in accordance with the present invention handles user credentials in order to gain access to a computer system on behalf of a particular user. Credentials should thus be handled in a manner that ensures that they will not be revealed to other users, or used to gain access on behalf of an unauthorized user. Thus, in a preferred embodiment the SSO system of the present invention employs a hierarchy of permissions that governs which users are allowed to perform which functions with respect to the SSO system.

Figure 7:
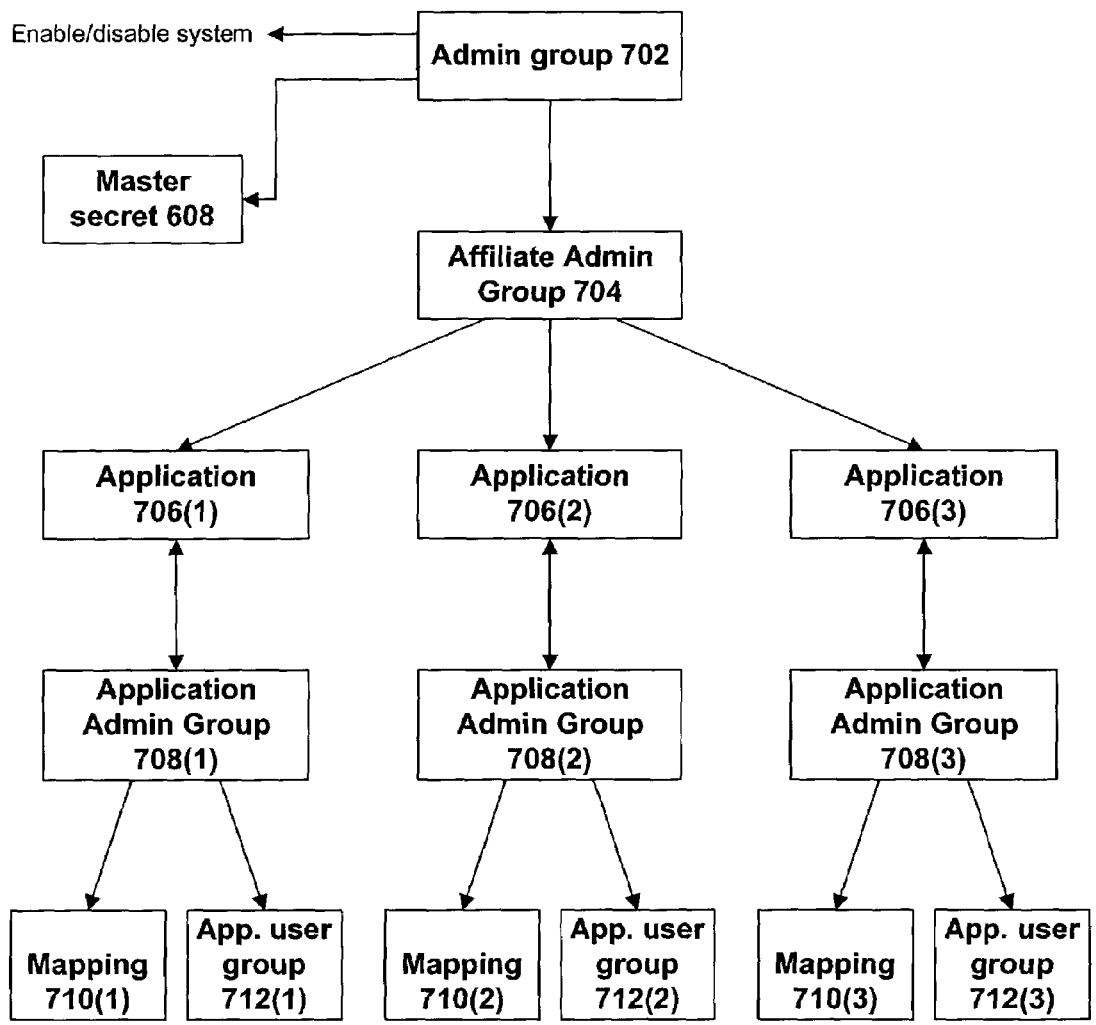
FIG. 7 is a block diagram of a hierarchy of access groups.

FIG. 7 shows a hierarchy of permissions in accordance with a preferred embodiment of the invention. Permissions are organized into "groups," where a group is a set of users who share a common set of privileges.

Admin group 702 is at the top of the hierarchy. Admin group 702 contains users who are allowed to perform any function within an SSO system. For example, users in admin group 702 are permitted to access or change master secret 608, or to enable/disable the SSO system. Users in admin group 702 are also permitted to define the membership in admin group 702 and affiliate admin group 704 (discussed below) (e.g., by adding or deleting members).

Affiliate admin group 704 contains users who are permitted to add and delete affiliate applications (e.g., affiliate applications 706(1), 706(2), and 706(3)). Members of affiliate admin group 704 are also permitted to define membership in application admin groups, which are described below. Additionally, members of affiliate admin group 704 can perform any action that members of the various application admin groups and application user groups (described below) are permitted to perform.

Each affiliate application is associated with an application admin group. Thus, affiliate applications 706(1), 706(2), and 706(3) are associated with application admin groups 708(1), 708(2), and 708(3), respectively. Each of the application admin groups 708(1), 708(2), and 708(3) has the ability to control the user mappings 710(1), 710(2), and 710(3), respectively that relate to that group's affiliate application. (A mapping is an entry in the credential store that correlates a particular user with his credentials for a particular affiliate application.) Thus, members of application admin group 708(1) can add, delete, or change user mappings 710(1) that are used to access affiliate application 706(1). Likewise, members of application admin groups 708(2) and 708(3) can add, delete or modify mappings 710(2) and 710(3), respectively. It should be noted that members of an application admin group preferably do not have plenary access to the credential store, but only the ability to affect mappings related to a particular affiliate application. Members of application admin groups are also permitted to redeem tickets; as discussed below, the adapter, which needs to redeem tickets, must be run as a member of the application admin group. Additionally, members of an application admin group can define the membership of the corresponding affiliate application's application user group. The application user groups are described below.

Each affiliate application is further associated with an application user group. Thus affiliate applications 706(1), 706(2), and 706(3) are associated with application user groups 712(1), 712(2), and 712(3), respectively. Members of an application user group are the users who are permitted to use the SSO system to sign on to the application user group's corresponding affiliate application. Thus, the membership of group 712(1) is the set of users for whom the SSO system has stored credentials for affiliate application 706(1). Likewise, groups 712(2) and 712(3) contain the users for whom credentials have been stored for affiliate applications 706(2) and 706(3), respectively.

In a preferred embodiment, a userID in an application admin group is used to run: (1) the adapter for application admin group's affiliate application, and (2) any software that allows admins to add, delete, and modify the credentials for an affiliate application. Thus, when the adapter for affiliate application 706(1) runs, it will preferably run under a userId in application admin group 708(1). Additionally, there may be software that permits a user to change his credentials for affiliate application 706(1) (i.e., the user's entry in mapping 710(1)); this software also preferably runs under a userID in application user group 708(1). It should be noted that that the existence of application admin groups 708(1), 708(2), and

708(3) is advantageous, because it avoids having to run an adapter at the level of an administrator who may have plenary access to the entire SSO system. If an adapter had to be run at the level of a plenary administrator (e.g., admin group 702 or affiliate admin group 704), then the adapter would be able to affect mappings for all affiliate applications, and would also be able to add or delete affiliate applications from the system. By defining application admin groups that can access the mappings for their own affiliate applications, but cannot access the mappings for any other applications, the potential for the system to be sabotaged by an adapter whose behavioral integrity has been compromised is reduced.

Similarly, the separate existence of admin group 702 and affiliate admin group 704 allows control over the master secret on the one hand, and the adding/deleting of affiliate applications on the other hand, to be parceled out separately. Thus, a set of users can be given the power to add and delete affiliate applications by assigning those users to affiliate admin group 704, and a smaller number of users (e.g., one highly-trusted user) can be given access to master secret 608 by assigning those users (or that one user) to admin group 702.

Exemplary Structure for Storing Affiliate Credentials

Figures 8, 10:
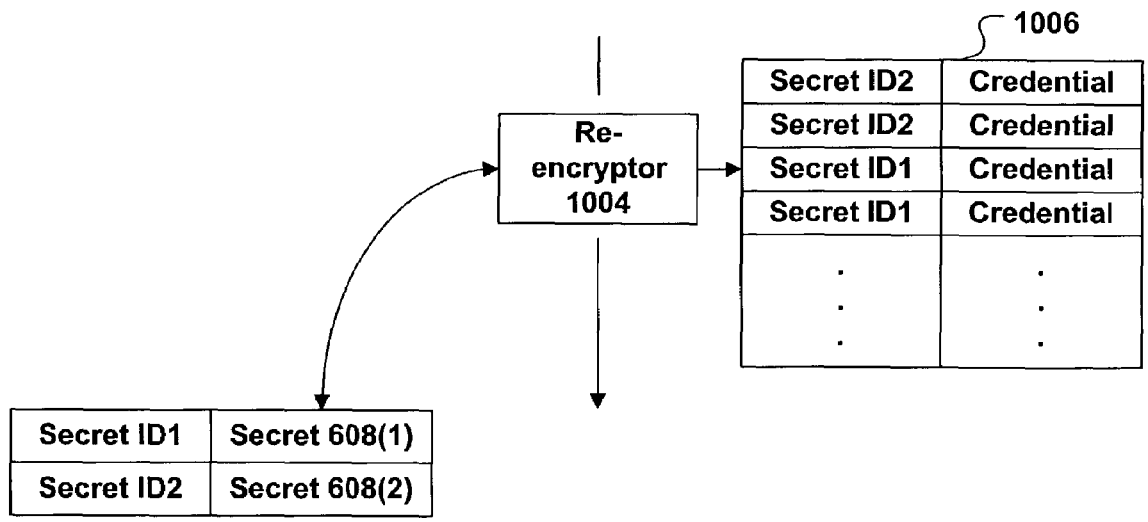
FIG. 8 is a block diagram of a structure for storing credentials.
FIG. 10 is a block diagram of a store of encrypted credentials and a rolling re-encryptor.

FIG. 8 shows an exemplary structure for storing affiliate credentials, and for correlating the credentials on an affiliate with a user in the originating domain.

The exemplary structure comprises two tables 801 and 802. Table 801 comprises four columns. The attributes of the columns are NTD ("NT Domain"), NTU ("NT User"), XA ("external Application"), and XU ("external User"). (The use of "NT" in the first two attributes refers to the fact that the originating domain (e.g., domain 201, shown in FIGS. 2, 3, and 4) is typically a MICROSOFT WINDOWS NT environment, or an environment based on a successor to the WINDOWS NT operating system, such as the WINDOWS 2000 or WINDOWS XP operating systems. However, it will be understood that the invention is not limited to the case where the originating domain is based on the WINDOWS operating system.) Each row of table 801 stores the name of the domain and user name of a user who will sign on to an affiliate application (columns NTD and NTU), the name of the affiliate application to which the user will be signed-on (column XA), and the user's corresponding userID for the external application. Thus, in the example of FIG. 8, table 801 contains a row for the user "henry," indicating that he is in the "Redmond" domain, that he may use an affiliate application named "UNIX," and that the user name that should be used for the UNIX affiliate application is "HSMITH." Similarly, the user "james" contains an entry indicating that he is in the "Redmond" domain, and will use the "UNIX" affiliate application with the userID "JJONES." A user who is permitted to use more than one affiliate application may have more than one entry in table 801. For example, "james" has a second entry indicating that he can use the affiliate application named "IBM" with the userID "JJ".

Table 802 comprises three columns, with attributes XA, XU, and XP. XA and XU have the meanings explained above, and XP refers to the "eXternal password." Table 802 contains a row for each XA/XU combination, and lists the password that is to be used for the affiliate application in the XA column when signing on for the user in the XU column. Thus, table 802 lists "fish" as the password that should be used for the userID "HSMITH" in the "UNIX" affiliate application, "bird" as the password that should be used for the userID "JJONES" in the "UNIX" application, and "elephant" as the password that should be used for the userID "JJ" in the "IBM"
affiliate application. As noted above, some affiliate applications—e.g., the case of an SAP application running in a UNIX environment—may require more than one userID/password combination. If, for example, the adapter will present a first userID/password combination to sign onto a UNIX system, and then a second userID/password combination to sign onto an SAP application within that UNIX system, then the second userID/password may be stored in the XP column. In such a case, an entry in the XP column will contain: (1) the password for the UNIX system; (2) the userId for the SAP application; and (3) the password for the SAP application. (The userID for the UNIX system can still be stored in the XU field.) Table 802 can store any type of data in any column, and this data is passed verbatim to the adapter when the adapter redeems a ticket. Thus, an adapter for the above-mentioned UNIX-SAP combination will be configured to separate the three components contained in the XP field, and to use those components accordingly. In the most general case, the XP field can store any type of credentials that may be required by an affiliate application, and the adapter for that affiliate application will be configured to interpret and use the data contained in that field in a manner appropriate for the affiliate application.

When the credentials needed for a particular user to sign onto a particular affiliate application need to be retrieved (e.g., during a ticket redemption), SSO service 408 (shown in FIG. 4) looks up the current domain/user/affiliate application combination in table 801. Based on the domain/user/affiliate application combination, table 801 is used to look up the user's userID (i.e., in the XU column) for the affiliate application that the user will be signed-on to. After retrieving the userId from the XU column, SSO service 408 uses the combination of affiliate application and affiliate-userID (i.e., the XA and XU columns) to lookup the user's password in the XP column of table 802. In effect, XA and XU together are a candidate key for table 802; since there are (presumably) no two users with the same name in a given affiliate application, the combination of XA and XU should uniquely identify a row of table 802, and thus the user's password for the affiliate application can be looked up in table 802 based on the XA/XU combination.

It should be noted that the structure shown in FIG. 8 is advantageous in the sense that it permits the decoupling of affiliate user names from affiliate passwords. Thus, if a user (such as "HSMITH") should change his password on an affiliate application, then a change only needs to be made to table 802. As long as the user HSMITH in the affiliate application continues to correspond to the user "henry" in the "Redmond" domain, no change needs to be made to table 801.

When the SSO system is set up, the table may be initially populated with certain credential information. For example, password tables (e.g., for domain 201 and/or domain 202) may be exported into an XML (eXtensible Markup Language) structure, and then imported into the SSO database. Typically, the passwords will not be included in the XML structure, and users (or, possibly, administrators) can set the passwords in the SSO database at a later time. As another example, a software object may be used to retrieve the userIDs and passwords for all relevant systems, and can populate the SSO database with the userIDs and passwords.

Exemplary Process for Signing Onto an Affiliate Application

Figure 9:
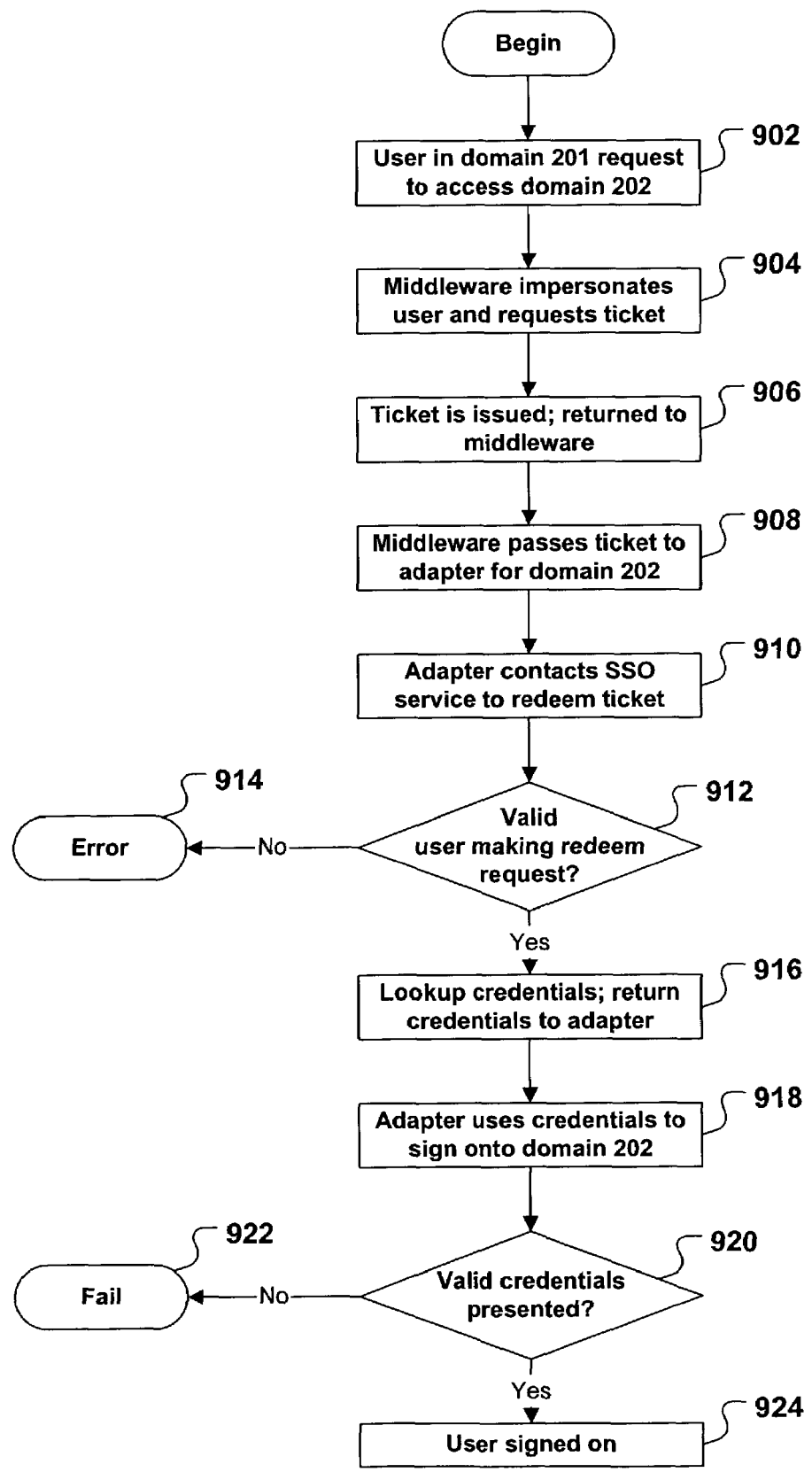
FIG. 9 is a flow diagram of a process of signing onto a second domain on behalf of a user who is signed onto a first domain.

FIG. 9 shows an exemplary process whereby a user who is signed into a domain may be signed onto an affiliate application in accordance with the invention.

At step 902, a user (e.g., "henry"), who is signed onto a domain (e.g., domain 201, shown in FIGS. 2, 3, and 4) requests access to an affiliate application in a different domain (e.g., domain 202). The request may be made explicitly by the user (e.g., the user may explicitly request access to domain 202), or the request may be made on the user's behalf in a manner that is transparent to the user (e.g., the user may be using software in domain 201, and that software may, in the course of performing its normal function, automatically request contacts domain 202 to obtain some information on the user's behalf).

The user's request is sent to a piece of software that handles the request—e.g., middleware 402 (shown in FIG. 4). Middleware 402 then requests a ticket from the SSO service (step 904). As described above in connection with FIG. 4, when middleware 402 requests a ticket, middleware 402 preferably impersonates the underlying user (e.g., "henry") who seeks to access an affiliate application. As further described above, the functionality of middleware 402 may be incorporated into an application that the user is using, rather than being a separate component.

When the SSO service receives the ticket request, the SSO service issues a ticket for the user who made the request (step 906). Since middleware 402 has preferably impersonated the underlying user who seeks to access an affiliate application when submitting the ticket request, SSO service concludes that the request came from that user (e.g., from "henry"), and thus issues a ticket for that user. Preferably, the ticket that is issued includes: the domain of the requesting user (e.g., "Redmond"), the userID of the requesting user (e.g, "henry"), and an expiration time (e.g., two minutes after the ticket is issued). Additionally, the ticket may include certain flags, as described above in connection with FIG. 5. When the SSO service issues the ticket, it provides the ticket to middleware 402.

When middleware has received the ticket, it passes the ticket to an adapter (step 908). The particular adapter that receives the ticket is the one that handles sign on for the affiliate application that the user (e.g., "henry") seeks to access. That adapter, in turn, contacts the SSO service to redeem the ticket (step 910).

When the SSO service receives the ticket and the redemption request, it determines whether the request has come from a user who is entitled to redeem a ticket (step 912). As described above in connection with FIG. 7, each affiliate application (and it's corresponding adapter) is associated with an "application admin group," and the adapter is generally run under one of the userIDs in that group. Members of the application admin groups are authorized to redeem tickets. When the SSO service receives a redemption request, it sees the userID of the process that is making the request, so the SSO service may verify that this userId is in the application admin group. (As described above in connection with FIG. 7, admin group 702 and affiliate admin group 704 have a superset of the privileges of the application admin groups; however, it is preferable to run the adapters under a particular application admin group instead of a higher-level group, so that the adapter cannot modify or access data relating to other adapters.)

If the SSO service determines that the user attempting to redeem the ticket is not authorized to redeem tickets, or if the ticket is expired, then the SSO service does not redeem the ticket, returns an error, and generates an error log message (step 914). If, however, the SSO service determines that the redemption request does come from a valid user and is non-expired, then the SSO service looks up the credentials for the user identified in the ticket, and returns those credentials to the requesting adapter (step 916). As described above in connection with FIG. 4, credentials are preferably unique to a particular combination of user and affiliate application, and thus the SSO service sends a particular set of credentials based on: (1) the user named in the ticket, and (2) the identity of the affiliate application for which the ticket is being redeemed. As further noted above, the ticket is preferably encrypted, so the SSO service typically obtains the decryption secret from the master secret server 606 (shown in FIG. 6) in order to decrypt the ticket.

Once the adapter receives the credentials, it uses the credentials to sign on to the affiliate application (step 918). For example, a computer in a different domain (e.g., computer 180 in domain 202, shown in FIG. 2) may prompt the adapter to enter a userID and password, and the adapter may provide the userId and password in response to the prompt. The affiliate application then validates the credentials (step 920). If the credentials are not valid (e.g., if the userID/password combination is not listed in credential record 212, shown in FIG. 2), then the sign on procedure fails (step 922). Otherwise, the user is signed onto the affiliate application (step 924), and can proceeds to access services and/or resources provided by the affiliate application.

Rolling Encryption of Credential Records

As described above in connection with FIG. 6, certain data (e.g., tickets and the stored credential records) are protected by a secret 608 (e.g., an encryption/decryption key) maintained by master secret server 606 (shown in FIG. 6). As is known in the art of cryptography, when large amounts of encrypted data are available to observers for a long period of time, there is a significant opportunity for observers to analyze the encrypted data and deduce the key, or otherwise to break the encryption scheme. Therefore, it is desirable to change secret 608 from time to time. However, since database 602 (shown in FIG. 6) stores credential records encrypted by secret 608, discarding the original secret 608 and replacing it with a new secret would make all of the encrypted records inaccessible, since they could no longer be decrypted. One solution is to decrypt all records with the old secret, re-encrypt the records with a new secret, and then discard the old secret. However, given the volume of data that may be stored in database 602, the process of decrypting and re-encrypting could take database 602 out of service for a significant amount of time.

In a preferred embodiment of the invention, when it is desired to change secret 608, credential records stored in database 602 can be re-encrypted with a new secret on a "rolling" basis. FIG. 10 shows a mechanism for such rolling re-encryption of the credential records. In the example of FIG. 10, two secrets 608(1) and 608(2) are maintained, and each secret has a secret ID (secret ID1 and secret ID2). Credential records 1006 are associated with the secret ID of the particular secret that was used to encrypt the record. (For simplicity, FIG. 10 shows credential records as existing all in one table. However, as described above in connection with FIG. 8, credential records may be spread out in pieces across several tables. It will be understood that a secret ID can be associated with an entire credential as shown in FIG. 10, or with a piece of a credential table. In general, a secret ID may be associated with any blob of encrypted data that is decryptable with the secret corresponding to that secret ID.)

Re-rencryptor 1004 traverses the encrypted credential records in some order. In the example of FIG. 10, all credential records are initially encrypted with the secret having ID1 and it is desired to re-encrypt those records with the secret having ID2. Thus, as re-rencryptor 1004 traverses credential records 1006, it decrypts each record using the secret identified by ID1, and then re-encrypts the records with the secret identified by ID2. Each time that re-encryptor 1004 re-encrypts a record, it associates the newly-encrypted record with secret ID2. Thus, for any credential record, it can be determined upon examination of the record's associated secret ID whether the record is encrypted with the secret 608(1) or 608(2). After all records have been re-encrypted with secret 608(1), then secret 608(2) can be discarded.

It should be noted that secret 608 (shown in FIG. 6) is also used to encrypt tickets. Thus, in a preferred embodiment in which secret 608 can be changed, a ticket may also include the ID of the secret that was used to encrypt a ticket.

A re-encryptor as described in FIG. 10 avoids having to take database 602 off-line while all of its data is re-encrypted, because both the old and new secrets can continue to be used during the re-encryption process. Additionally, re-encryptor 1004 can be run as a "background" process, so that it works while demand for the system is low.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for signing a first user of a first domain onto an affiliate application comprising:
   receiving a request to sign the first user onto the affiliate application, wherein;
      the affiliate application is one of a plurality of affiliate applications; and
      the affiliate application and the first domain are in environments having different operating systems;
   receiving a ticket indicative of the first user;
   providing the ticket to an adapter respectively associated with the affiliate application;
   redeeming the ticket to obtain a set of credentials associated with the first user;
   using the credentials to sign the first user onto the affiliate application; and
   running the adapter as a second user different from the first user, said second user having privileges to redeem tickets but not having privileges to add affiliate applications to, or delete affiliate applications from, said plurality of affiliate applications.

2. The method of claim 1, wherein the ticket comprises a user-identifier associated with the first user in the first domain.

3. The method of claim 1, wherein the ticket comprises an identifier of the first domain.

4. The method of claim 1, wherein the ticket comprises an expiration time.

5. The method of claim 1, wherein the ticket is encrypted.

6. The method of claim 1, wherein the affiliate application comprises a second domain different from the first domain.

7. The method of claim 1, wherein the affiliate application comprises software to which access is limited to users who possess valid credentials.

8. The method of claim 1, further comprising:
   using a process to request the ticket, the process running as a second user different from the first user, the process impersonating the first user when requesting the ticket.

9. The method of claim 1, wherein the set of credentials comprises a first user-identifier and a first password.

10. The method of claim 9, wherein the set of credentials further comprises a second user-identifier and a second password.

11. The method of claim 1, wherein the set of credentials is further associated with the affiliate application.

12. A system comprising:
   a component that receives a request from a user in a domain to sign onto a first affiliate application, and that requests a ticket for the user in response to receiving the request;
   a service that receives a request for the ticket and that issues the ticket in response to the request, the tickets identifying the user; and
   a plurality of adapters, each of the adapters being respectively associated with one of a plurality of affiliate applications, a first of the adapters being associated with said first affiliate application, the first adapter receiving the ticket from the component, communicating with the service to redeem the ticket for a set of credentials associated with the user, and using the credentials to sign the user onto the first affiliate application; and
   a database server that stores the identity of one or more users who are permitted to add or delete affiliate applications from the plurality of affiliate applications; and for each of the plurality affiliate applications, the identity of one or more users who are permitted to add, delete, or modify credentials associated with the affiliate application, there being at least one user who is permitted to add, delete, or modify credentials associated with at least one of the plurality of affiliate applications but whom is not permitted to add or delete affiliate applications from the plurality of affiliate applications.

13. The system of claim 12, wherein the service comprises or communicates with a database that stores the credentials.

14. The system of claim 13, wherein credentials stored in the database are indexed based the particular user and the particular affiliate application with which the credentials are associated.

15. The system of claim 12, wherein the credentials are encrypted, and wherein the service manages the decryption of credentials when redeeming tickets.

16. The system of claim 12, wherein the service manages encryption and decryption using a key and does not have persistent storage of the key, the key being persistently stored in a server with which the service communicates.

17. The system of claim 12, wherein the service causes the ticket to be encrypted when the ticket is issued, and wherein the service further causes the ticket to be decrypted when the ticket is redeemed.

18. The system of claim 12, wherein the service comprises:
   a cache, which stores credentials that have been redeemed, the service recurrently consulting a database in which the credentials are stored to determine whether the credentials stored in the cache are valid.

19. A computer-readable storage medium having computer-executable instructions to perform acts comprising:
   receiving a first request to issue a ticket;
   issuing the ticket in response to the first request, the first request identifying a first user in whose name the first request was made;
   receiving a second request to redeem a ticket;

determining that a respective issuer of the second request is authorized to redeem tickets;

locating a set of credentials associated with the first user and further associated with the issuer of the second request;

providing the set of credentials to the issuer of the second request; and encrypting a plurality of sets of credentials using a first key, the first key having a first identifier associated therewith;

decrypting plurality of sets of credentials using the first key, and re-encrypting the plurality of sets of credentials with a second key having a second identifier associated therewith, the second key being different from the first key, and the second identifier being different from the first identifier, whereby at some point in time some of the plurality of sets of credentials are encrypted with the first key and some of the plurality of sets of credentials are encrypted with the second key;

when decrypting data, checking which of the first and second identifiers is associated with the data and using either the first or second key to decrypt the data according to which identifier is associated with the data.

20. The computer-readable medium of claim 19, wherein a process that makes the first request is running under as a second user different from the first user, and wherein the process impersonates the first user when making the first request.

21. The computer-readable medium of claim 19, wherein the acts performable by the computer-executable further comprise:

causing the ticket to be encrypted prior to issuing the ticket; and causing the ticket to be decrypted in response to receiving the second request to redeem the ticket.

22. The computer-readable medium of claim 21, wherein the acts performable by the computer-executable further comprise:

contacting a server to obtain a key needed to decrypt the ticket.

23. The computer-readable medium of claim 19, wherein the acts performable by the computer-executable further comprise:

checking the identity of the issuer of the second request against a list of users who are authorized to redeem tickets.

24. The computer-readable medium of claim 19, wherein the acts performable by the computer-executable farther comprise:

persistently storing the first key;

performing encryption and decryption of data using said first key;

wherein the instructions to persistently store the first key can be either activated or not activated depending upon whether an instance of the computer-executable instructions is initiated as a master secret server.

* * * * *